United States Patent
Lamb et al.

(10) Patent No.: US 9,615,153 B2
(45) Date of Patent: Apr. 4, 2017

(54) SYSTEM AND METHOD FOR APPLYING AN EXTENDED MULTIPOINT PROTOCOL TO WIRELESS ACCESS SYSTEMS

(75) Inventors: Lowell Lamb, San Ramon, CA (US); Glen Kramer, Petaluma, CA (US); Ryan Hirth, Windsor, CA (US); Edward Boyd, Petaluma, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 364 days.

(21) Appl. No.: 13/495,057

(22) Filed: Jun. 13, 2012

(65) Prior Publication Data
US 2013/0315593 A1 Nov. 28, 2013

Related U.S. Application Data

(60) Provisional application No. 61/651,726, filed on May 25, 2012.

(51) Int. Cl.
*H04B 10/00* (2013.01)
*H04Q 11/00* (2006.01)

(52) U.S. Cl.
CPC ..... *H04Q 11/0067* (2013.01); *H04Q 11/0071* (2013.01)

(58) Field of Classification Search
USPC ........................................ 370/466
See application file for complete search history.

(56) References Cited

U.S. PATENT DOCUMENTS

| | | | |
|---|---|---|---|
| 6,577,643 B1 * | 6/2003 | Rai | H04L 12/4633 370/328 |
| 7,355,996 B2 | 4/2008 | Hrastar | |
| 2004/0109688 A1 * | 6/2004 | Kim | H04Q 11/0067 398/68 |
| 2004/0184474 A1 * | 9/2004 | Kim | H04Q 11/0067 370/445 |
| 2005/0158048 A1 * | 7/2005 | Sung et al. | 398/66 |
| 2006/0039390 A1 * | 2/2006 | Boyd et al. | 370/404 |
| 2006/0098680 A1 * | 5/2006 | Kelesoglu et al. | 370/444 |
| 2007/0025734 A1 | 2/2007 | Oogushi et al. | |
| 2007/0230471 A1 | 10/2007 | Ikeda et al. | |
| 2007/0237177 A1 * | 10/2007 | Endo et al. | 370/468 |
| 2008/0002976 A1 | 1/2008 | Tal et al. | |
| 2008/0260385 A1 | 10/2008 | Eguchi | |

(Continued)

FOREIGN PATENT DOCUMENTS

CN 101563889 10/2009

OTHER PUBLICATIONS

TW Office Action, Jul. 31, 2014.
(Continued)

*Primary Examiner* — Ken N Vanderpuye
*Assistant Examiner* — David Lambert
(74) *Attorney, Agent, or Firm* — Foley & Lardner LLP (57) ABSTRACT

A system and method for applying an extended multipoint control protocols to wireless access systems. A medium-to-medium adaptor can be provided in an adaptor node that can interface with an upstream optical line terminal in a PON domain and a downstream device in a non-PON wireless domain. The medium-to-medium adaptor enables an implementation of end-to-end services across multiple quality of service (QoS) domains by passing all traffic with controlled delay and without contention.

21 Claims, 10 Drawing Sheets

(56) References Cited

U.S. PATENT DOCUMENTS

| | | |
|---|---|---|
| 2009/0162063 A1 | 6/2009 | Mizutani et al. |
| 2009/0162065 A1 | 6/2009 | Mizutani et al. |
| 2009/0202249 A1 | 8/2009 | Ogushi |
| 2009/0245805 A1* | 10/2009 | Akasaka et al. ............ 398/128 |
| 2010/0098407 A1 | 4/2010 | Goswami et al. |
| 2010/0119227 A1 | 5/2010 | Ikeda et al. |
| 2010/0329668 A1 | 12/2010 | Boyd et al. |
| 2011/0058813 A1 | 3/2011 | Boyd et al. |
| 2011/0142447 A1 | 6/2011 | Boyd et al. |
| 2011/0200331 A1 | 8/2011 | Li et al. |
| 2012/0141139 A1 | 6/2012 | Bakhru et al. |
| 2012/0155877 A1 | 6/2012 | Effenberger et al. |
| 2012/0251114 A1 | 10/2012 | Effenberger et al. |
| 2012/0321312 A1 | 12/2012 | Timm et al. |
| 2012/0321315 A1 | 12/2012 | Timm et al. |
| 2013/0004155 A1 | 1/2013 | Liang et al. |
| 2013/0039182 A1 | 2/2013 | Das et al. |

OTHER PUBLICATIONS

Non-Final Office Action for U.S. Appl. No. 13/495,042 mailed Mar. 27, 2015.
Final Office Action for U.S. Appl. No. 13/495,042 mailed Dec. 16, 2014.
Non-Final Office Action for U.S. Appl. No. 13/495,042 mailed Aug. 13, 2014.
Final Office Action for U.S. Appl. No. 13/495,042 mailed Oct. 7, 2015.
Office Action for Chinese Patent Application No. 2012105730891 mailed Nov. 30, 2015 (including English summary).
Non-Final Office Action for U.S. Appl. No. 13/495,042 mailed Jan. 25, 2016.
Office Action for Chinese Patent Application No. 2012105730904 mailed Dec. 28, 2015 (including English summary).

* cited by examiner

SYSTEM AND METHOD FOR APPLYING AN EXTENDED MULTIPOINT PROTOCOL TO WIRELESS ACCESS SYSTEMS

The present application claims priority to provisional patent application No. 61/651,726, filed May 25, 2012.

BACKGROUND

Field of the Invention

The present invention relates generally to multipoint control protocols and, more particularly, to a system and method for applying an extended multipoint control protocols to wireless access systems.

Introduction

In a point-to-multipoint system such as an Ethernet passive optical network (EPON), a single optical line terminal (OLT) at a head end can be designed to communicate with a plurality of optical network units (ONUs) at various end nodes. This arrangement leverages a shared fiber optic plant by multiple networking nodes. Typically, the OLT broadcasts its transmissions in the downstream direction to all the ONUs. Each of the ONUs, on the other hand, transmit in the upstream direction to the OLT in a pre-assigned time slot.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

In various contexts where the high cost of optical fiber installation may not justify the extension of the optical fiber to the end network unit, mixed media access systems can result. For example, mixed media access systems such as PON-fed DSL and PON-fed Ethernet in telecom networks, Ethernet PON over coax (EPoC) in cable multiple systems operator (MSO) networks, PON-fed WiFi, WiMAX, 3G, LTE, etc. in wireless networks, and PON-fed power-line networks can be used. In these mixed media access systems, multiple management and quality of service (QoS) domains would exist.

In addressing mismatches at the domain boundaries, a medium-to-medium adaptor is provided that can interface with an upstream OLT in a PON domain and a downstream device in a non-PON domain. The medium-to-medium adaptor enables an implementation of end-to-end services across multiple QoS domains by passing all traffic with controlled delay and without contention. In one embodiment, the medium-to-medium adaptor can be configured to map a resource apportionment identifier in a header portion of the frame structure (e.g., preamble of an Ethernet frame or header of a GPON encapsulation method (GEM) or xGPON encapsulation (xGEM) frame) contained in network traffic communicated with an upstream OLT in a PON domain with a resource apportionment identifier in an Ethernet frame contained in network traffic communicated with a downstream device in a non-PON domain. The resource apportionment identifier is assigned to an end network unit by the OLT and enables the end network unit to report a status to the OLT and to grant bandwidth by the OLT to the end network unit. The communication of the resource apportionment identifier end-to-end across the PON domain and non-PON domain enables a control of the end-to-end QoS in the mixed media access system. As an example, in a mixed media access system that includes multiple medium-to-medium adaptors that each interface with an OLT in a PON domain and that support a non-PON wireless network domain (e.g., WiFi), control of the end-to-end QoS of a mobile station can be maintained even as the mobile station roams among the coverage areas of the multiple medium-to-medium adaptors.

Figure 1:
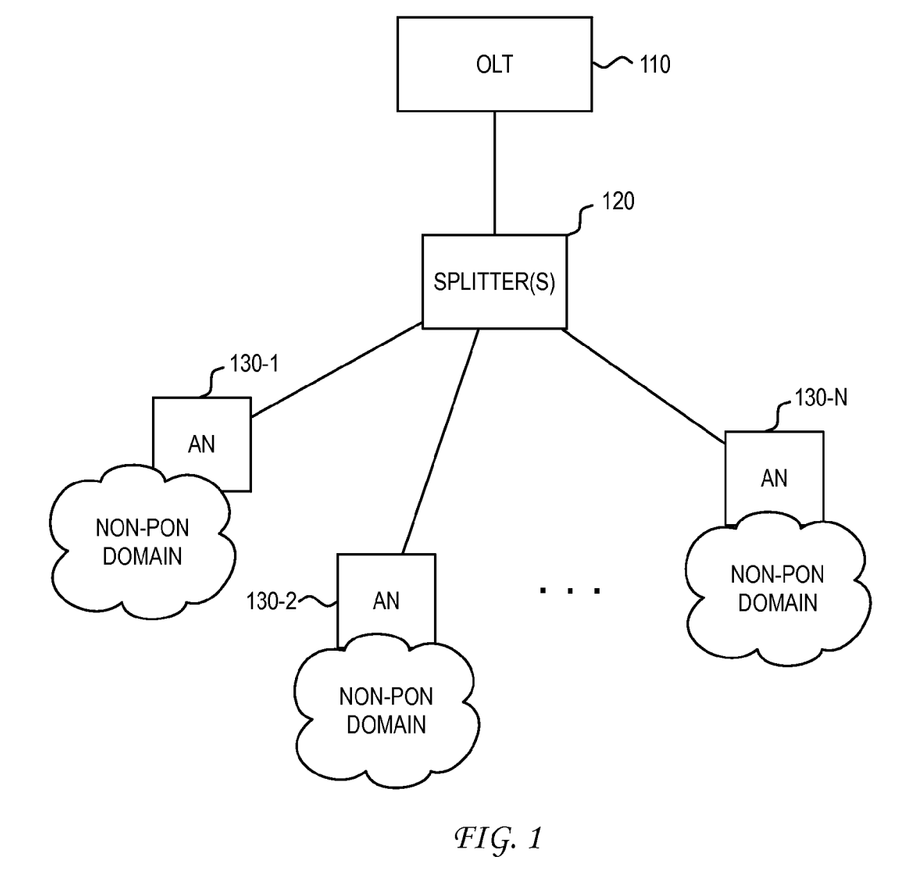
FIG. 1 illustrates an example of a point-to-multipoint communication network.

FIG. 1 illustrates an example of a point-to-multipoint communication network that interfaces a PON domain with a non-PON domain. As illustrated, the point-to-multipoint network includes a single OLT 110 that communicates with a plurality of adaptor nodes 130-*n* via a PON. The illustrated PON includes splitter(s) 120, which enable a single feeder cable to be split into multiple drop cables for the individual adaptor nodes 130-*n*. Each adaptor node 130-*n* can interface with a non-PON domain such as that supported by further coaxial cable, copper twisted pair, fiber optic media, wireless, etc. network links.

Here, it should be noted that the PON domain can represent an EPON such as that defined by IEEE 802.3, GPON, BPON, xGPON, or NGPON defined by ITU-T, or the like. In general, the advantage of the PON is that it allows sharing of the fiber optic plant by multiple network nodes. In the downstream direction, OLT 110 is configured to broadcast frames containing packets to the end network units that are responsible for extracting the particular packets that are destined for that location, while in the upstream direction the end network units are designed to transmit in a way to avoid collisions between the packets using, for example, a time division multiple access (TDMA) communication protocol.

Figure 2:
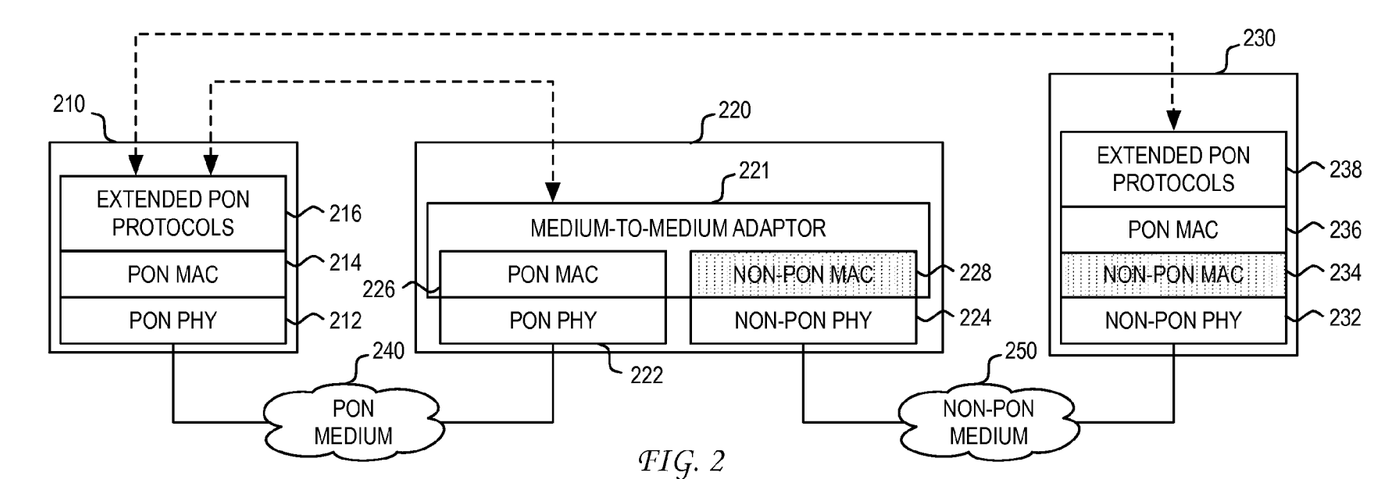
FIG. 2 illustrates an example of extending multipoint control protocols to a mixed media access system.

In a mixed media access system, adaptor node 130-*n* is configured to interface with a PON domain and a non-PON domain. FIG. 2 illustrates an example use of an adaptor node that can be configured to extend a multipoint control protocol to a mixed media access system. As illustrated, OLT 210 communicates with end network unit 230 via adaptor node 220. Communication between OLT 210 and adaptor node 220 is facilitated by PON medium 240. Communication between adaptor node 220 and end network unit 230 is facilitated by non-PON medium 250 that can include, for example, coaxial cable, copper twisted pair, fiber optic media, wireless, etc. network links.

In providing an interface between a PON domain and a non-PON domain, adaptor node 220 can be configured to include medium-to-medium adaptor 221. As illustrated, adaptor node 220 includes PON physical layer device (PHY) 222 and PON media access control (MAC) 226 that are configured to operate with PON PHY 212 and PON MAC 214, respectively, in OLT 210. Adaptor node 220 also includes non-PON PHY 224 and non-PON MAC 228 that are configured to operate with non-PON PHY 232 and non-PON MAC 234, respectively, in end network unit 230. Here, it should be noted that non-PON MAC 228 in medium-to-medium adaptor 221 is optionally included depending on whether or not communication in the non-PON domain uses a non-PON MAC to facilitate controls such as addressing and non-PON channel access. For example, where the non-PON domain includes a WiFi link, medium-to-medium adaptor 221 can be configured to include a complementary 802.11 MAC to operate with an 802.11 MAC in end network unit 230. As would be appreciated, the necessity and/or particular type of non-PON MAC used in the non-PON domain would be implementation dependent.

As further illustrated in FIG. 2, end network unit 230 also includes PON MAC 236 that resides on top of the optional non-PON MAC 234. Residing on top of PON MAC 236 in end network unit 230 is extended PON protocols 238. In one example applied to IEEE 802.3 EPON, the extended PON protocols includes a lower layer Multi-Point Control Protocol (MPCP) and a higher layer Operation, Administration and Maintenance (OAM). In another example applied to ITU-T GPON, the extended PON protocols includes a lower layer Physical Layer Operations and Maintenance (PLOAM) and a higher layer Operation Management Control Interface (OMCI).

Extended PON protocols 238 in end network unit 230 is designed to cooperate with extended PON protocols 216 in OLT 210 in providing end-to-end services across multiple management and QoS domains. As illustrated in FIG. 2, medium-to-medium adaptor 221 is also designed to cooperate with extended PON protocols 216 in OLT 210. In general, extended PON protocols 216 can be designed to control the behavior of end network unit 230 and to configure intermediate adaptor node 220 to pass any and all traffic with controlled delay and without contention. More specifically, extended PON protocols 210 can be designed to control the behavior of end network unit 230 and to configure intermediate adaptor node 220 to schedule transmission windows to avoid collisions or contention.

The operation of adaptor node 220 in facilitating the provision of end-to-end services is described in greater detail below. Here, it should be noted that PON MAC 236 and extended PON protocols 238 in end network unit 230 would be unaware of the particular non-PON medium on which it operates.

Figure 3:
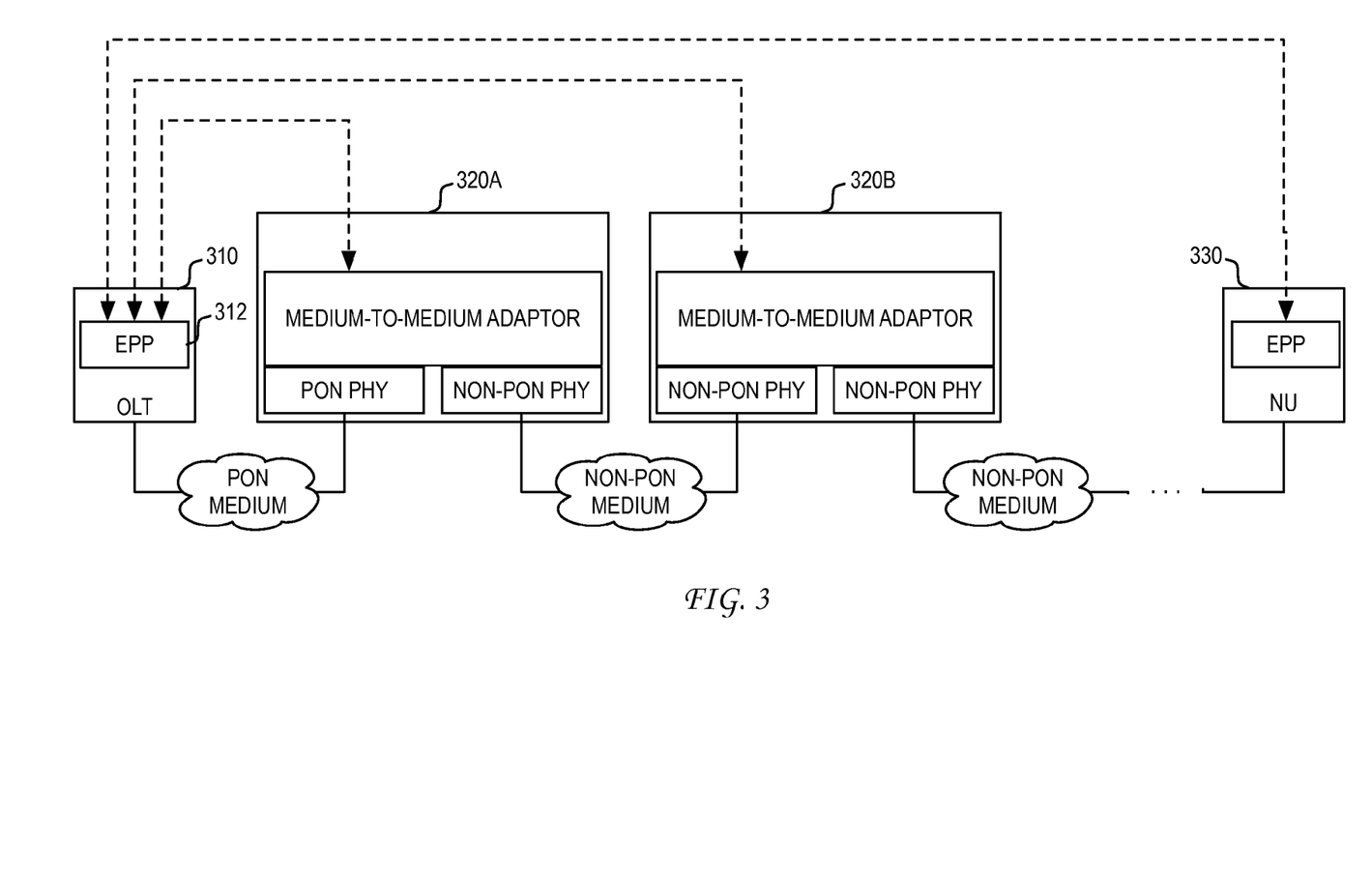
FIG. 3 illustrates another example of extending multipoint control protocols to a mixed media access system.

Prior to describing the operation of adaptor node 220 in greater detail, it should be noted that the principles of the present invention are not confined to an end-to-end link having a single intermediate adaptor node. As illustrated in FIG. 3, a multipoint control protocol can be extended to a mixed media access system that includes a plurality of intermediate adaptor nodes. As illustrated, OLT 310 is coupled to end network unit 330 via multiple intermediate adaptor nodes 320A, 320B, etc. In various implementations, intermediate adaptor nodes 320A, 320B, etc. can be used to facilitate an end-to-end service across a plurality of non-PON domains in addition to a PON domain between OLT 310 and adaptor node 320A. As would be appreciated, each non-PON domain can represent an independently operated domain that utilizes a different non-PON medium. As illustrated, extended PON protocols 312 in OLT 310 can be designed to control the behavior of end network unit 330 and to configure intermediate adaptor nodes 320A, 320B, etc. to pass any and all traffic with controlled delay and without contention.

Figure 4:
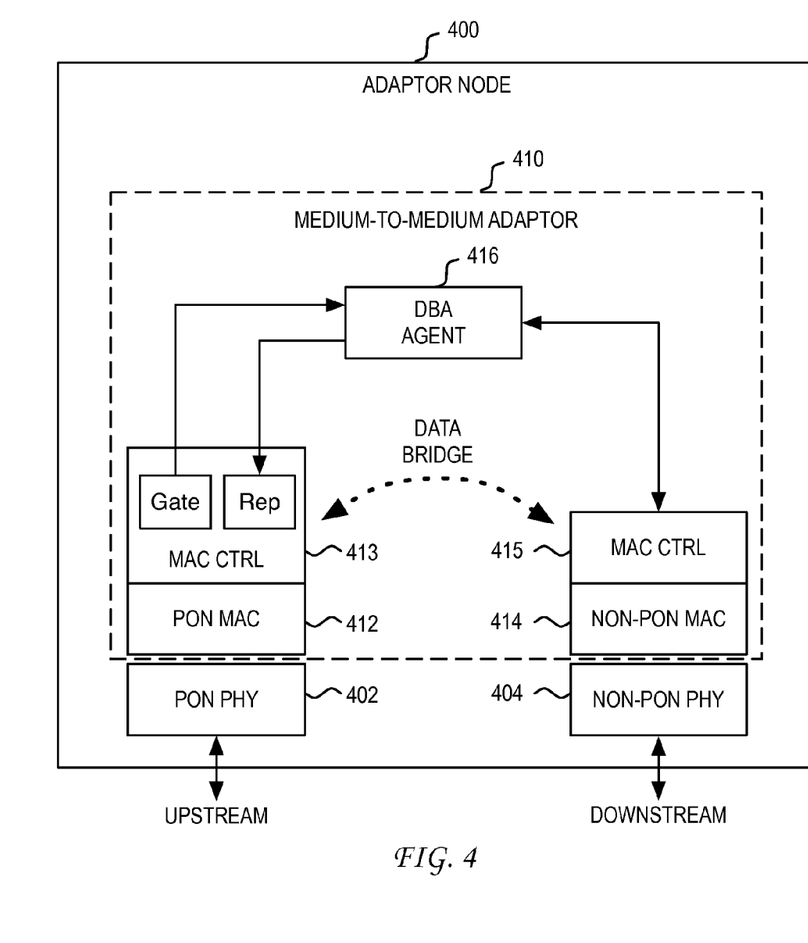
FIG. 4 illustrates an embodiment of an adaptor node in a mixed media access system.

FIG. 4 illustrates an embodiment of an intermediate adaptor node that can facilitate end-to-end services across multiple management and QoS domains. In the illustrated example, adaptor node 400 includes PON PHY 402 that interfaces with an upstream OLT and non-PON PHY 404 that interfaces with a downstream device (e.g., end network unit or other intermediate adaptor node). Where the adaptor node interfaces with an upstream adaptor node, then the adaptor node can include a non-PON PHY.

Adaptor node 400 also includes medium-to-medium adaptor 410. In general, medium-to-medium adaptor 410 is designed to extend a multi-point control protocol over the non-PON domain and provides a data bridge between upstream and downstream domains. In the example embodiment illustrated in FIG. 4, medium-to-medium adaptor 410 includes PON MAC 412 and MAC Control 413 that reside above PON PHY 402. Medium-to-medium adaptor 410 also includes non-PON MAC 414 and MAC Control 415 that reside above non-PON PHY 404. This example embodiment can be used to facilitate communication with an upstream PON domain and a downstream non-PON domain. Where the intermediate adaptor node facilitates communication with an upstream non-PON domain, then the medium-to-medium adaptor can also include a non-PON MAC that resides below the PON MAC.

As further illustrated in FIG. 4, medium-to-medium adaptor 410 also may include a dynamic bandwidth allocation (DBA) agent 416. In general, DBA agent 416 facilitates a bandwidth assignment mechanism that relies on downstream bandwidth assignment messages and upstream status report messages that are handled by the bandwidth assignment and reporting processes within MAC Control 413. In general, the bandwidth assignment messages can be used to assign a transmission timeslot to the network unit, while the status report messages can be used to report conditions back to the OLT. These reports can assist the OLT in making intelligent allocation decisions. In one embodiment, adaptor node 400 can be designed to include per-service statistics counters, alarm triggers, and threshold-crossing alerts that enable unified alarm surveillance and performance monitoring.

In one example applied to IEEE 802.3 EPON, the bandwidth assignment message is represented by the EPON GATE message that identifies a timeslot based on a start time and length, while the status report message is represented by the EPON REPORT message. In another example applied to ITU-T GPON, the bandwidth assignment message is enabled using the US BW Map in the header of the GEM/XGEM frame, which identifies a timeslot based on a start time and an end time, while the status report message is enabled through the request for an upstream transmission slot using either the upstream Ind field in the PLOu block or the DBRu field.

In ensuring that intermediate adaptor node 400 passes traffic in scheduled transmission windows to avoid collisions or contention within the network, the bandwidth assignment process within MAC control 413 can control the upstream transmission of data that resides in a transmission queue, which holds traffic received from a downstream device in a non-PON domain. As would be appreciated, the transmission queue can also include message traffic (e.g., REPORT messages) that is generated by intermediate adaptor node 400 and is to be delivered upstream to the OLT.

To facilitate the transmission of data in scheduled transmission windows, the intermediate adaptor node is designed to pass traffic with controlled delays. For example, during the autodiscovery phase during which time the OLT detects newly connected end network units and learns the round-trip delays of those end network units, the intermediate adaptor node can be configured to pass messages after a delay of a consistent period of time. This consistent period of time can be defined to be a delay period that would be sufficient to accommodate processing by the adaptor node.

Through an introduction of a controlled delay period by the intermediate adaptor node, the OLT can accurately determine the round-trip delay between the OLT and the end network unit. Such accuracy is an important factor in enabling the OLT in scheduling bandwidth assignments to the various end network units. For example, if the DBA agent in the OLT desires to receive data from an end network unit at time t, then the bandwidth assignment message would be sent to the end network unit exactly at time t-RTT, where RTT is the round-trip time to the end network unit (including any controlled delays introduced by the intermediate adaptor node(s)).

Figure 5:
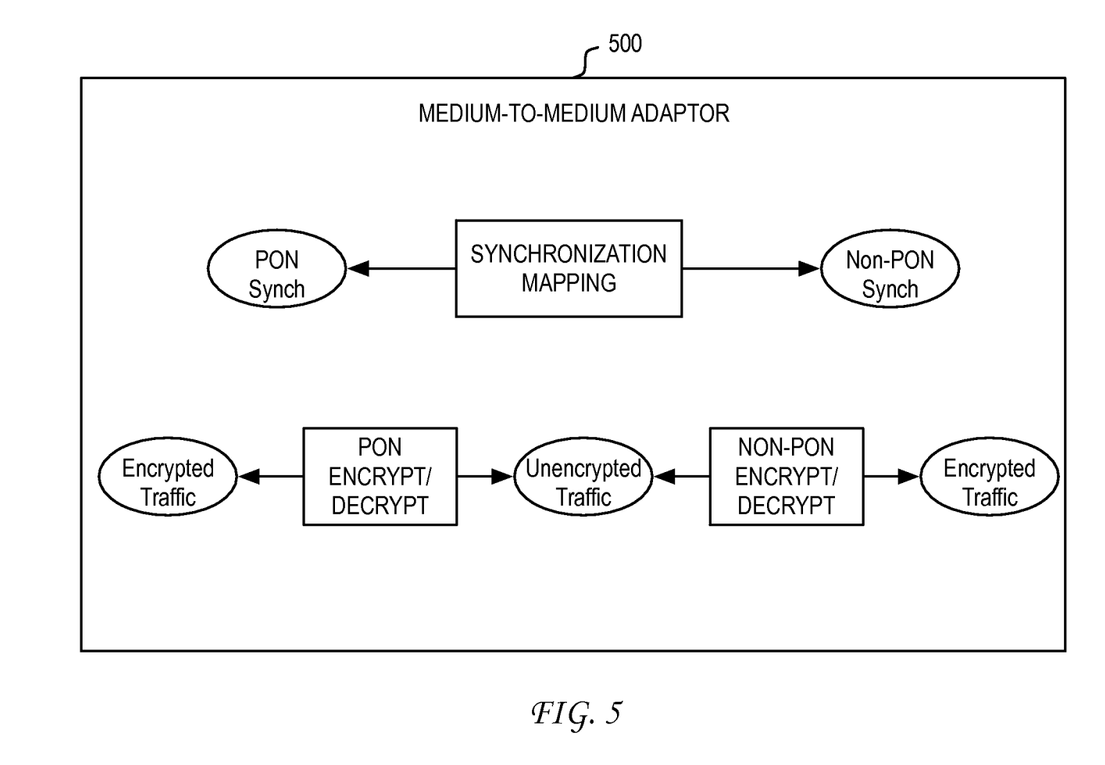
FIG. 5 illustrates examples of processing by a medium-to-medium adaptor.

FIG. 5 illustrates further examples of processing by a medium-to-medium adaptor. As illustrated, medium-to-medium adaptor 500 can include a synchronization mapping module. This synchronization mapping module can be configured to address the differences in synchronization within the PON domain as compared to synchronization within the non-PON domain. In various examples, synchronization mapping module can be configured to address differences in transmission rates, clocking, media access, etc. that are used in the PON domain and the non-PON domain.

In one application, synchronization mapping module can be used to facilitate a full-duplex/half-duplex adaptation where the PON domain operates in a full duplex mode and the non-PON domain operates in a half duplex mode. Here, the OLT, adaptor node and end network unit can provide unified management of the upstream and downstream traffic. More specifically, the extended PON protocol can be used to schedule upstream transmission by the end network unit and downstream transmission by the medium-to-medium adaptor to coincide with the time-slots in the non-PON domain.

Another example of processing by medium-to-medium adaptor 500 is the encryption adaptation where a first form of encryption is used in the PON domain and a second form of encryption is used in the non-PON domain. In providing an interface between the PON domain and the non-PON domain, medium-to-medium adaptor 500 can decrypt PON traffic to produce unencrypted traffic that is processed by the medium-to-medium adaptor, prior to encrypting traffic to be sent over the non-PON domain. In one embodiment, the traffic encrypted for the non-PON domain has previously been encrypted using PON encryption. As would be appreciated, medium-to-medium adaptor can be configured to address mismatches between capacity, latency, bit error rate (BER), forward error correction (FEC), security, etc. between the PON domain and non-PON domain boundaries.

As has been described, a medium-to-medium adaptor contained in an intermediate adaptor node can be configured to perform various adaptations in providing an interface between a PON domain and a non-PON domain. As would be appreciated, the specific types of adaptations would be dependent on the particular implementation of the non-PON domain. Notwithstanding these various potential adaptations, the medium-to-medium adaptor is designed to implement end-to-end services across multiple management and QoS domains. To facilitate this implementation of end-to-end services across multiple management and QoS domains, a resource apportionment identifier (e.g., LLID or AllocID) that is assigned by an OLT to an end network unit is communicated end-to-end across the PON domain and non-PON domain.

Figure 6:
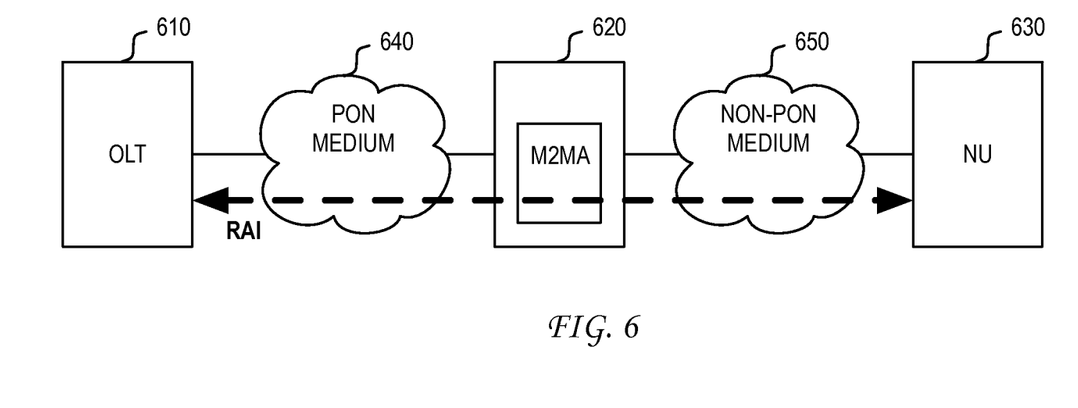
FIG. 6 illustrates an example of communication of a resource apportionment identifier over a mixed media access system.

FIG. 6 illustrates an example of communication of a resource apportionment identifier over a mixed media access system. As illustrated, the mixed media access system includes a PON domain that facilitates communication between OLT 610 and intermediate adaptor node 620 over PON medium 640 and a non-PON domain that facilitates communication between intermediate adaptor node 620 and end network unit 630 over non-PON medium 650. As noted above, the resource apportionment identifier is assigned to end network unit 630 by OLT 610 and enables end network unit 630 to report a status to OLT 610 and to grant bandwidth by OLT 610 to end network unit 630. As illustrated, the assigned resource apportionment identifier is carried end-to-end over the PON domain and the non-PON domain.

In one embodiment, the medium-to-medium adaptor can be configured to map a resource apportionment identifier in a header portion of the frame structure contained in network traffic communicated with OLT 610 in a PON domain to a resource apportionment identifier in an Ethernet frame contained in network traffic communicated with end network unit 630 in a non-PON domain. This process of mapping of the resource apportionment identifier is designed to enable the end-to-end communication of the resource apportion identifier between the OLT and the end network unit, thereby enabling end-to-end service implementation.

Figure 7:
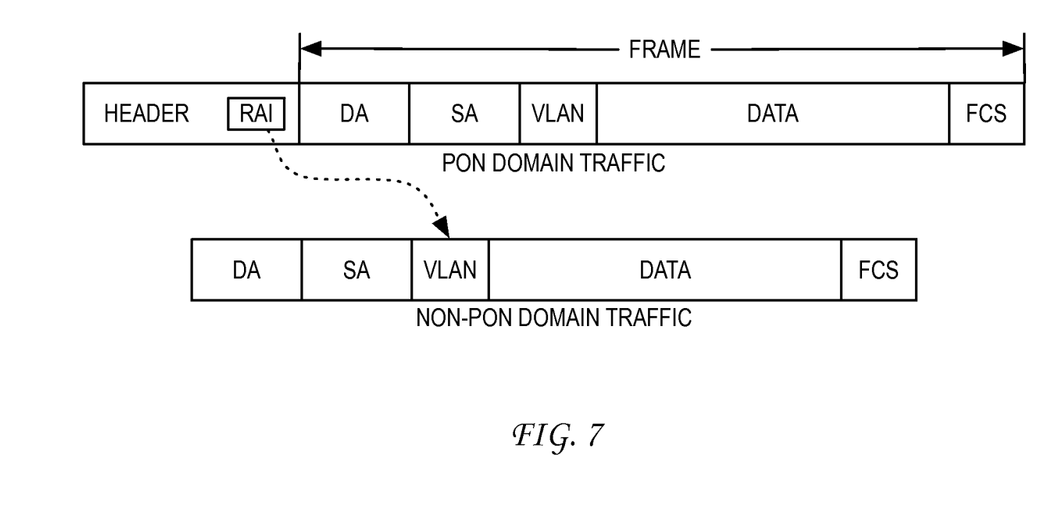
FIG. 7 illustrates an example of mapping a resource apportionment identifier at an intermediate adaptor node.

FIG. 7 illustrates one example embodiment of mapping a resource apportionment identifier at an intermediate adaptor node to facilitate communication over the mixed media access system. As illustrated, a frame structure used in a PON domain includes a header portion and a frame portion. In one example, the frame portion includes a destination MAC address (DA) field, a source MAC address (SA) field, a virtual local area network (VLAN) field, a data field, and a frame check sequence (FCS) field. For the PON domain traffic, the resource apportionment identifier is included within the header portion of the frame structure.

In mapping traffic between the PON domain and the non-PON domain, the header portion of the PON domain traffic is removed. As illustrated, the resource apportionment identifier that is needed for implementation of the end-to-end service is extracted from the header portion of the PON domain traffic, and inserted into the frame portion of the non-PON domain traffic. In the illustrated example, the resource apportionment identifier can be inserted into a 16-bit portion of the VLAN field of the Ethernet frame. As would be appreciated, the principles of the present invention are not limited to the insertion of the resource apportionment identifier into a VLAN field of the Ethernet frame. In other embodiments, the resource apportionment identifier can be inserted into another defined field of the Ethernet frame or at a defined offset position within the data portion of the Ethernet frame.

Regardless of the location within the Ethernet frame at which the resource apportionment identifier is inserted, its inclusion within the Ethernet frame enables the resource apportionment identifier to be communicated over the non-PON domain for receipt by the end network unit. At the receiving end network unit, the Ethernet frame can be parsed and the resource apportionment identifier extracted for use by the PON MAC and extended PON protocols at the end network unit.

Figure 8:
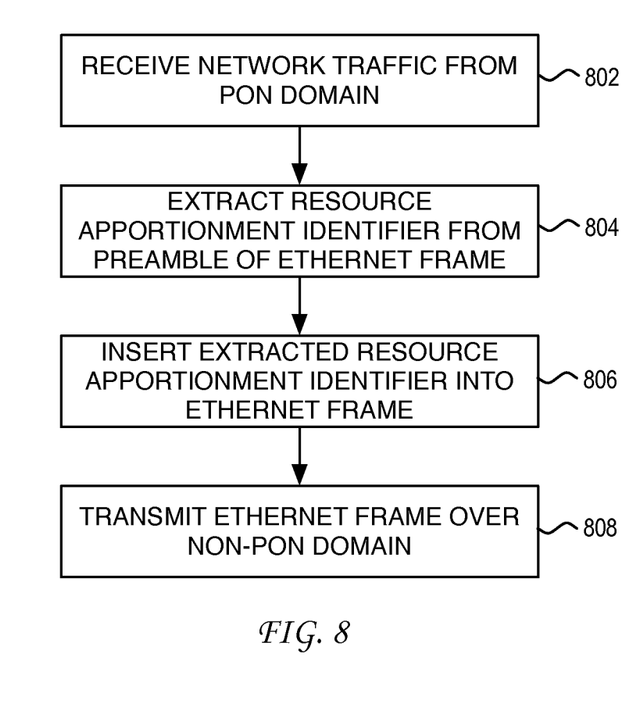
FIG. 8 illustrates an example of a process of the present invention.

To further illustrate the mapping process of a resource apportionment identifier by an intermediate adaptor node, reference is now made to the flowchart of FIG. 8 which illustrates an example process of the present invention. As illustrated, the process begins at step 802 where an intermediate adaptor node receives, via a PON PHY, network traffic from an OLT. At step 804, the medium-to-medium adaptor in the intermediate adaptor node would extract a resource apportionment identifier from a header portion of a frame structure contained in the received network traffic. As noted above, the resource apportionment identifier is assigned by the OLT to an end network station and is used to grant bandwidth to the end network station and to enable the end network station to report status back to the OLT.

Next, at step 806, the extracted resource apportionment identifier is inserted into an Ethernet frame in a defined field or at a defined offset location of the Ethernet frame. The particular field or location at which the resource apportionment identifier is inserted would be implementation dependent. Finally, at step 808, the Ethernet frame that contains the resource apportionment identifier is then transmitted, via a non-PON PHY of the intermediate adaptor node, to a downstream non-PON domain.

It is a feature of the present invention that the mapping of a resource apportionment identifier from a header portion to the frame portion itself enables the resource apportionment identifier to be carried over the non-PON domain for use by the end network unit. This enables the establishment of an end-to-end emulation of a point-to-point service that crosses multiple domains. In one embodiment, the non-PON PHY in the non-PON domain can be enhanced to recognize Ethernet frames with additional tags or fields that are used for the communication of a resource apportionment identifier.

The communication of the resource apportionment identifier over the non-PON domain enables a PON point-to-point multipoint protocol to be extended to provide management and control of a hybrid network having a PON domain and a non-PON domain. To illustrate the application of such management and control over a hybrid network, consider an example application to a hybrid network having an IEEE 802.11 non-PON domain.

Figure 9:
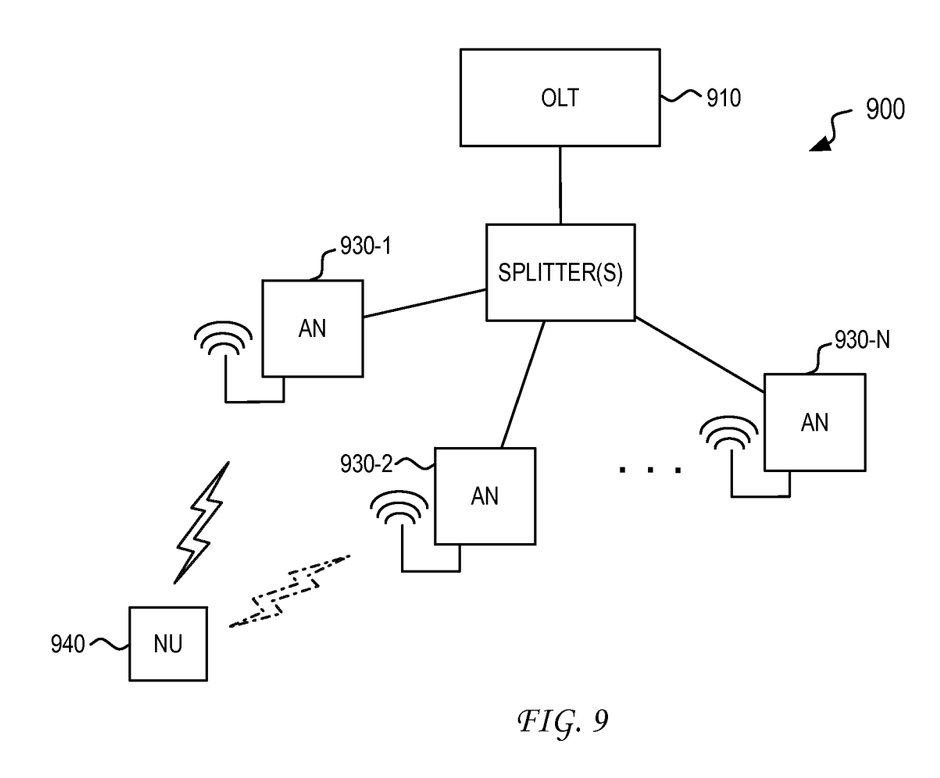
FIG. 9 illustrates an example of extending multipoint control protocols to a WiFi network.

FIG. 9 illustrates an example of such a hybrid network. As illustrated, hybrid network 900 includes a single OLT 910 that communicates with a plurality of adaptor nodes 930-*n* via a PON. In this example, each intermediate adaptor node 930-*n* interfaces with an 802.11 non-PON domain that is supported by wireless network links. Each intermediate adaptor node 930-*n* would include an 802.11 non-PON PHY and a medium-to-medium adaptor that includes an 802.11 non-PON MAC that would enable communication with a wireless end network unit 940. Operation of such a hybrid network is now described with reference to FIG. 10, which illustrates a flowchart of a process of the present invention. In this example illustration, reference is made to EPON messaging. As would be appreciated, equivalent messaging can be used in the context of the ITU-T GPON framework.

Figure 10:
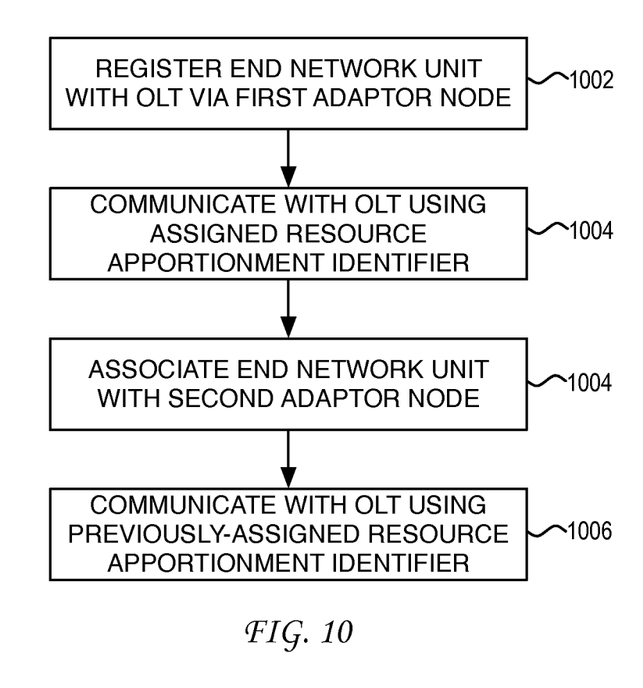
FIG. 10 illustrates an example of a second process of the present invention.

When end network unit 940 enters into the range of adaptor node 930-1 in the hybrid network, end network unit 940 would first establish a WiFi connection with adaptor node 930-1 via communication with the 802.11 non-PON PHY and the 802.11 non-PON MAC in adaptor node 930-1. Once the WiFi connection is established between adaptor node 930-1 and end network unit 940, end network unit 940 can then register with OLT 910 via adaptor node 930-1 at step 1002. In this process, end network unit would respond to an autodiscovery process that is initiated by OLT 910 using a discovery GATE message. After end network unit 940 sets its local clock to the timestamp received in the discovery GATE message, end network unit 940 would then transmit a REGISTER_REQ message after waiting a random delay period following the start time of the initialization slot indicated by the discovery GATE message. The transmitted message would include the MAC address of end network unit 940 as well as the timestamp that represents the time that the REGISTER_REQ message was sent by end network unit 940. The timestamp enables OLT 910 to determine the round-trip time from OLT 910 to end network unit 940. Upon parsing and verifying the REGISTER_REQ message, OLT 910 would then issue a REGISTER message that contained the resource apportionment identifier that is assigned to end network unit 940.

After end network unit 940 has registered with OLT 910, end network unit 940 can then communicate with OLT 910 using the assigned resource apportionment identifier at step 1004. In this process, normal GATE and REPORT messages can be communicated between OLT 910 and end network unit 940 via adaptor node 930-1 using the resource apportionment identifier. This communication over the hybrid network that includes a PON domain and a non-PON domain is enabled by adaptor node 930-1, which facilitates the interface between the PON domain and non-PON domain in passing traffic between OLT 910 and end network unit 940. In one embodiment, OLT 910 would continue to monitor and adjust the round-trip time value for a connection to end network unit 940 via adaptor node 930-1 to ensure that synchronization through the PON domain is maintained as end network unit 940 moves within the range of adaptor node 930-1.

As end network unit 940 moves within the coverage area of hybrid network 900, end network unit can associate itself with a new wireless access point at step 1004. This process is illustrated in FIG. 9 as a change in communication by end network unit 940 with adaptor node 930-1 to communication by end network unit 940 with adaptor node 930-2. As noted above, adaptor node 930-2 interfaces with the PON domain via communication with OLT 910. As such, adaptor node 930-2 would also include an 802.11 non-PON PHY and a medium-to-medium adaptor that includes an 802.11 non-PON MAC that would enable communication with wireless end network unit 940.

The change in association of end network unit 940 from adaptor node 930-1 to adaptor node 930-2 would be facilitated by the 802.11 non-PON PHYs and 802.11 non-PON MACs contained in end network unit 940 and adaptor node 930-2. Significantly, the change in association of end network unit 940 from adaptor node 930-1 to adaptor node 930-2 would not require re-registration with OLT 910. Here, it is a feature of the present invention that the communication at step 1006 between end network unit 940 and OLT 910 would be facilitated using the same resource apportionment identifier that was obtained through the registration of end network unit 940 with OLT 910 via adaptor node 930-1. To facilitate the communication of end network unit 940 with OLT 910 via adaptor node 930-2, OLT 910 would again continue to monitor and adjust the round-trip time value for a connection to end network unit 940 via adaptor node 930-2 to ensure that synchronization through the PON domain is maintained as end network unit 940 moves within the range of adaptor node 930-2. Here, it should be noted that the use of the same resource apportionment identifier in communication with OLT via adaptor node 930-1 as well as adaptor node 930-2, enables end-to-end QoS to be controlled as end network unit 940 roams within the various coverage areas of the hybrid network.

As would be appreciated, the particular form of control over end-to-end services would be implementation dependent. What is significant is that such control over end-to-end services can be extended across various forms of hybrid networks.

In one embodiment, the extension of the multipoint control protocol can enable power management in promoting energy efficiency. For example, where non-PON domain network devices support low-power modes of operation, the management of the low-power modes of operation can be managed by the OLT using the resource apportionment identifier.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    establishing, by an end network unit, a first wireless link with a first medium-to-medium adaptor coupled to an optical line terminal via a first passive optical network link;
    receiving, by the end network unit from the optical line terminal via the first wireless link with the first medium-to-medium adaptor, a first Ethernet frame comprising a resource apportionment identifier of an optical network protocol assigned to the end network unit at a first position in the first Ethernet frame different from a resource apportionment identifier of the Ethernet protocol, the resource apportionment identifier of the optical network protocol extracted by the first medium-to-medium adaptor from a first passive optical network frame transmitted by the optical line terminal and inserted into the Ethernet frame at the first position;
    subsequently establishing, by the end network unit, a second wireless link with a second medium-to-medium adaptor coupled to the optical line terminal via a second passive optical network link; and
    transmitting, by the end network unit to the second medium-to-medium adaptor via the second wireless link, a second Ethernet frame comprising a status report including the resource apportionment identifier of the optical network at the first position in the second Ethernet frame, the second medium-to-medium adaptor extracting the resource apportionment identifier of the optical network protocol from the first position in the second Ethernet frame and inserting the resource apportionment identifier into a second passive optical network frame transmitted via the second passive optical network link to the optical line terminal.

2. The method of claim 1, further comprising:
    transmitting, by the end network unit to the first medium-to-medium adaptor before establishing the second wireless link, a third Ethernet frame comprising a status report including the resource apportionment identifier, the first medium-to-medium adaptor extracting the resource apportionment identifier from the third Ethernet frame and inserting the resource apportionment identifier into a third passive optical network frame transmitted via the first passive optical network link to the optical line terminal.

3. The method of claim 2, wherein the optical line terminal adjusts a round-trip time value for a connection to the end network unit, responsive to receiving the third passive optical network frame.

4. The method of claim 1, wherein establishing the first wireless link further comprises:
    receiving, by the end network unit from the first medium-to-medium adaptor, a discovery message transmitted by the optical line terminal via the first passive optical network link and retransmitted by the first medium-to-medium adaptor via the first wireless link.

5. The method of claim 4, wherein the discovery message comprises a timestamp; and further comprising setting, by the end network unit, a local clock to the timestamp, responsive to receiving the discovery message.

6. The method of claim 5, further comprising transmitting, by the end network unit to the first medium-to-medium adaptor, a registration request comprising a second timestamp and an identifier of the end network unit, the first medium-to-medium adaptor retransmitting the registration request via the first passive optical network link.

7. The method of claim 1, further comprising:
    transmitting, by the end network unit to the second medium-to-medium adaptor after establishing the second wireless link, a third Ethernet frame comprising a status report including the resource apportionment identifier, the second medium-to-medium adaptor extracting the resource apportionment identifier from the third Ethernet frame and inserting the resource apportionment identifier into a third passive optical network frame transmitted via the second passive optical network link to the optical line terminal.

8. The method of claim 7, wherein the optical line terminal adjusts a round-trip time value for a connection to the end network unit, responsive to receiving the third passive optical network frame.

9. The method of claim 8, wherein adjusting the round-trip time value for the connection to the end network unit further comprises adjusting the round-trip time value from a first value measured via a communication via the first passive optical network link, first medium-to-medium adaptor, and first wireless link.

10. The method of claim 1, wherein the resource apportionment identifier is a logical link identifier (LLID) or an allocation identifier (AllocID).

11. A device, comprising:
a physical layer device configured to communicate, via a first wireless link, with a first medium-to-medium adaptor coupled to an optical line terminal via a first passive optical network link, and communicate, via a second wireless link, with a second medium-to-medium adaptor coupled to the optical line terminal via a second passive optical network link; and
a media access control module configured to:
establish the first wireless link with the first medium-to-medium adaptor,
receive, from the optical line terminal via the first medium-to-medium adaptor via the first wireless link, a first Ethernet frame comprising a resource apportionment identifier of an optical network protocol assigned to an end network unit at a first position in the first Ethernet frame different from a resource apportionment identifier of the Ethernet protocol, the resource apportionment identifier of the optical network protocol extracted by the first medium-to-medium adaptor from a first passive optical network frame transmitted by the optical line terminal and inserted into the Ethernet frame at the first position;
subsequently establish, by the end network unit, the second wireless link with the second medium-to-medium adaptor; and
transmit, via the second wireless link to the second medium-to-medium adaptor, a second Ethernet frame comprising a status report including the resource apportionment identifier of the optical network at the first position in the second Ethernet frame, the second medium-to-medium adaptor extracting the resource apportionment identifier of the optical network protocol from the first position in the second Ethernet frame and inserting the resource apportionment identifier into a second passive optical network frame transmitted via the second passive optical network link to the optical line terminal.

12. The device of claim 11, wherein the media access control module is further configured to:
transmit, to the first medium-to-medium adaptor before establishing the second wireless link, a third Ethernet frame comprising a status report including the resource apportionment identifier, the first medium-to-medium adaptor extracting the resource apportionment identifier from the third Ethernet frame and inserting the resource apportionment identifier into a third passive optical network frame transmitted via the first passive optical network link to the optical line terminal.

13. The device of claim 12, wherein the optical line terminal adjusts a round-trip time value for a connection to the end network unit, responsive to receiving the third passive optical network frame.

14. The device of claim 11, wherein the media access control module is further configured to:

receive, from the first medium-to-medium adaptor, a discovery message transmitted by the optical line terminal via the first passive optical network link and retransmitted by the first medium-to-medium adaptor via the first wireless link.

15. The device of claim 14, further comprising a local clock; and
wherein the discovery message comprises a timestamp; and
wherein the media access control module is further configured to set the local clock to the timestamp, responsive to receiving the discovery message.

16. The device of claim 15, wherein the media access control module is further configured to transmit, to the first medium-to-medium adaptor, a registration request comprising a second timestamp and an identifier of the end network unit, the first medium-to-medium adaptor retransmitting the registration request via the first passive optical network link.

17. The device of claim 11, wherein the media access control module is further configured to transmit, to the second medium-to-medium adaptor after establishing the second wireless link, a third Ethernet frame comprising a status report including the resource apportionment identifier, the second medium-to-medium adaptor extracting the resource apportionment identifier from the third Ethernet frame and inserting the resource apportionment identifier into a third passive optical network frame transmitted via the second passive optical network link to the optical line terminal.

18. The device of claim 17, wherein the optical line terminal adjusts a round-trip time value for a connection to the end network unit, responsive to receiving the third passive optical network frame.

19. The device of claim 18, wherein adjusting the round-trip time value for the connection to the end network unit further comprises adjusting the round-trip time value from a first value measured via a communication via the first passive optical network link, first medium-to-medium adaptor, and first wireless link.

20. The device of claim 11, wherein the resource apportionment identifier is a logical link identifier (LLID) or an allocation identifier (AllocID).

21. A method, comprising:
receiving, by a medium-to-medium adaptor coupled to an optical line terminal via a first passive optical network link, a first passive optical network frame from the optical line terminal;
extracting, by the medium-to-medium adaptor, a resource apportionment identifier of the optical network protocol and a payload from the first passive optical network frame;
generating, by the medium-to-medium adaptor, an Ethernet frame comprising the extracted payload;
inserting, by the medium-to-medium adaptor, the extracted resource apportionment identifier of the optical network protocol into the Ethernet frame at a predetermined first position different from a position of a resource apportionment identifier of the Ethernet protocol; and
transmitting, by the medium to medium adaptor via the wireless link to an end network unit, the generated Ethernet frame.

* * * * *